March 17, 1953  N. T. KELLEY  2,631,766
JACK STORAGE STRUCTURE
Filed Dec. 14, 1948  2 SHEETS—SHEET 1
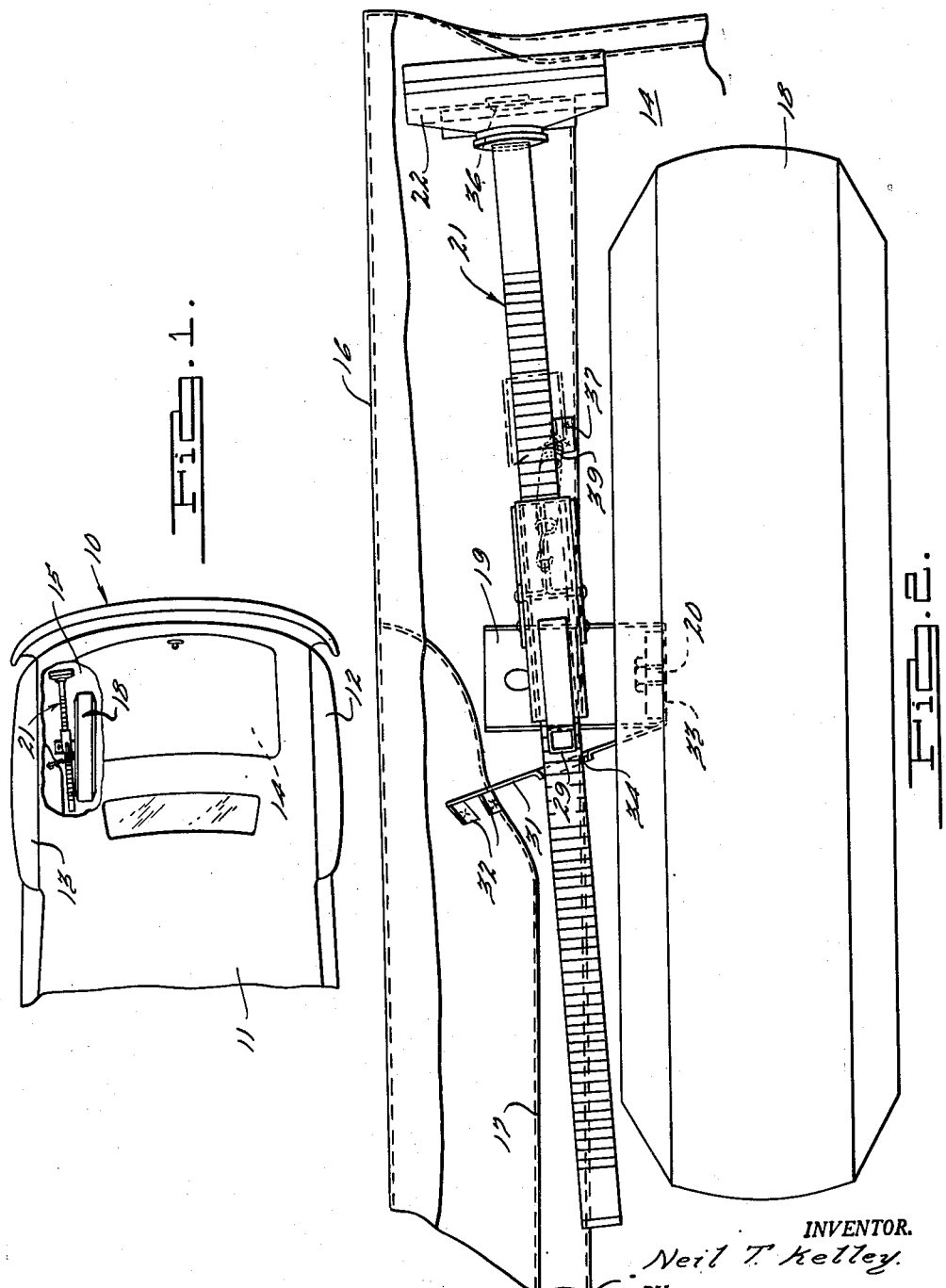
INVENTOR.
Neil T. Kelley
BY Harness and Harris
ATTORNEYS

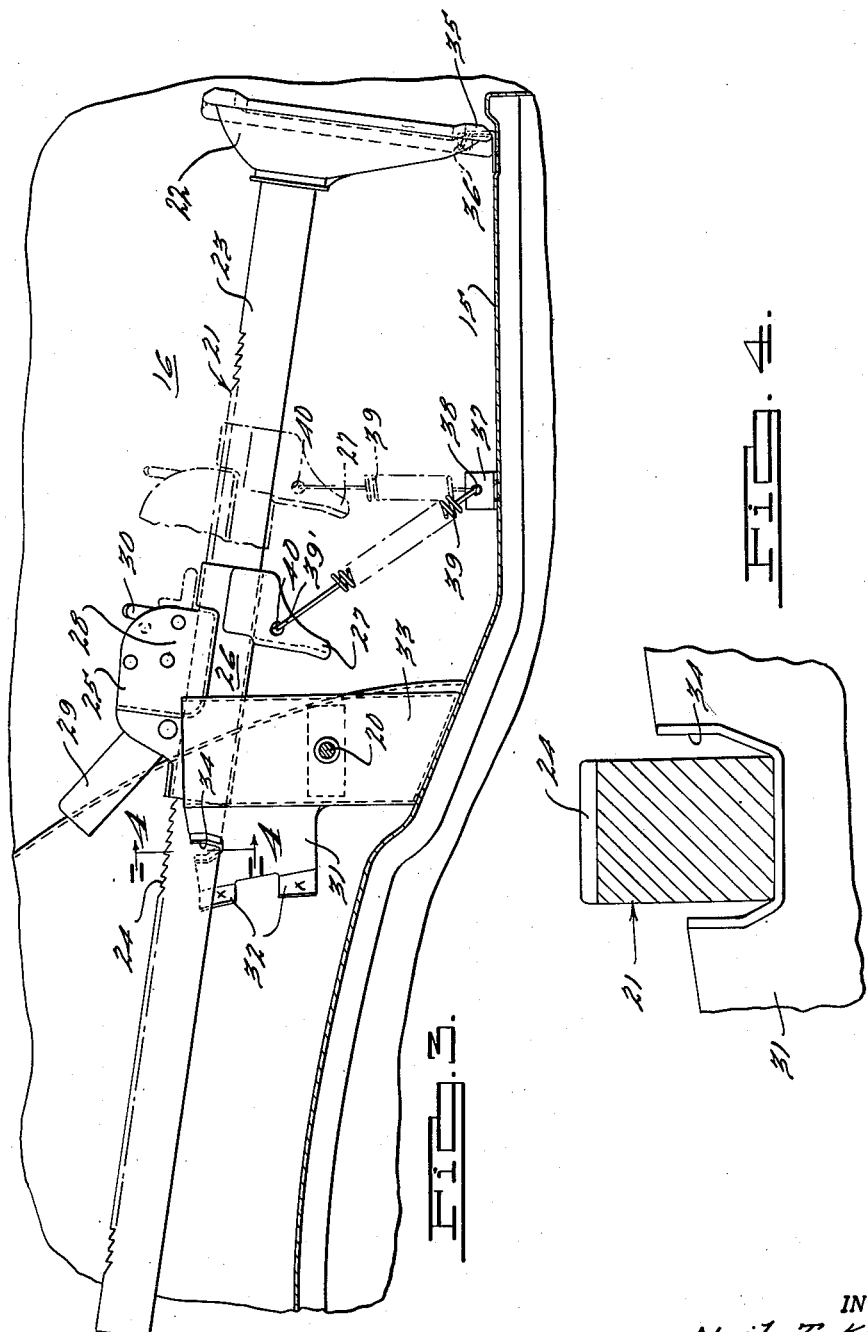

Patented Mar. 17, 1953

2,631,766

UNITED STATES PATENT OFFICE 2,631,766

JACK STORAGE STRUCTURE

Neil T. Kelley, Huntington Woods, Mich., assignor to Chrysler Corporation, Highland Park, Mich., a corporation of Delaware Application December 14, 1948, Serial No. 65,239

11 Claims. (Cl. 224—42.45)

My invention relates to vehicle tire jacks.

More particularly my invention relates to an improved structure for storing a vehicle tire jack in the baggage compartment of a vehicle.

It is a principal object of my invention to provide a motor vehicle baggage compartment with improved structure for storing the tire jack of the vehicle wherein the jack is so disposed and confined as to prevent rattle.

Another object of my invention is to provide a vehicle baggage compartment with structure for mounting the tire jack, this structure being disposed at a location not generally otherwise utilized.

A further object of my invention is to provide a vehicle baggage compartment with jack stowing structure of very simplified and inexpensive construction employing in part structure normally used to mount the spare tire of the vehicle.

Other objects and advantages will become more apparent from the following description of one embodiment of my invention, reference being made to the accompanying drawings in which:

Fig. 1 is a plan view of the rear end of a motor vehicle having portions cut away to show my improved structure;

Fig. 2 is an enlarged plan view of the structure shown within the cut away portion of Fig. 1;

Fig. 3 is a side elevational view of the structure shown in Fig. 2 with the vehicle spare tire removed to more clearly show my improved jack storing mechanism;

Fig. 4 is a transverse sectional view taken on the line 4—4 of Fig. 3.

In the drawings, I have shown a motor vehicle generally designated by the numeral 10 including a body portion 11, rear fenders 12 and 13 and including a baggage compartment 14. The compartment 14 is bounded in part by a compartment floor 15 and a vertical wall 16 which has an inwardly bowed portion 17 which makes room for a vehicle road wheel (not shown). The compartment 14 is provided with a spare tire 18 which is positioned vertically within the compartment 14 adjacent the wall 16. The tire 18 is secured in its vertical position by an L-shaped mounting bracket 19, one leg thereof being secured by a nut and bolt assembly 20 to the spare tire 18 and the other leg being secured to the floor 15.

A vehicle jack generally designated by the numeral 21 is disposed between the spare tire 18 and the wall 16. The jack 21 is of conventional construction and comprises a base portion 22 secured to one end of a supporting rod 23. The rod 23 is provided with conventional teeth 24 which engage and retain in place a lift mechanism 25. The lift mechanism is provided with an elongated hollow portion 26 which receives the rod 23 therein and has secured at the lower end thereof a lifting member 27 which is adapted to be engaged beneath a portion of a vehicle or other device to be supported or elevated by the jack. The lift mechanism 25 is also provided with jacking mechanism (not shown) which is enclosed within a casing 28. A lever 29 is pivotally mounted on the casing 28 and is adapted to actuate the jacking mechanism within the casing 28 to move the lift mechanism 25 along the rod 23 in a leftward direction as viewed in Fig. 3 in response to actuation thereof. The lift mechanism 25 is of conventional construction in that rotation of the lever 29 moves the mechanism 25 in graduated steps along the rod 23 away from the base portion 22. The mechanism is also provided with a release lever 30 which when actuated allows movement of the mechanism towards the base portion 22.

In accordance with my invention, I have provided means for conveniently storing a jack 21 between the tire 18 and the wall 16. The means comprises a supporting bracket 31 having one end integrally joined to flanges 32 which are welded or in some other suitable way secured to the wall 16. The other extremity of the bracket 31 is provided with a flange 33 which extends in substantially the opposite direction than the flanges 32 and is secured to the mounting bracket 19 by the bolt assembly 20. The bracket 31 extends diagonally across the space between the wall 16 of the vehicle and the tire mounting bracket 19, as shown in Fig. 3 and it is provided with a recess or notch 34 having an open side located in the upper edge of the bracket 19 intermediate the flanges 32 and 33. The notch 34 is adapted to receive the rod 23 when the jack 21 is in its stored position. As anchor bracket 35, secured to the floor 15 of the luggage compartment, is adapted to hold the base 22 against movement in a direction away from the supporting bracket 31 and against upward movement relative to the floor 15. The anchor bracket 35 has a forwardly extending lip which is adapted to extend into a recess 36 provided in the base 22 adjacent its peripheral edge. Another bracket 37 is secured to the floor 15 intermediate the bracket 35 and the mounting bracket 19 and is provided with an aperture 38 which receives one end of a coil spring 39. The other extremity of the coil spring 39 is provided with a hook 39' which is detachably engageable in an aperture 40 formed in the lift member 27.

In Fig. 3, I have indicated by the dotted lines the position of the lift mechanism 25 when the jack 21 is initially placed in the position as shown in the drawings. In this position, the coil spring 39 is unexpanded and the rod 23 is loosely placed within the recess 34 formed in the supporting bracket 31. However, when the lever 29 is actuated so that the lift mechanism 25 is moved by graduated steps along the rod 23 away from the base portion 22, the spring 39 is tensioned and the rod 23 is pulled down upon the supporting bracket 31 within the recess 34 while the base portion 22 is held from rightward movement as viewed in Fig. 3 by the anchor bracket 35.

By employing the jack storage structure heretofore described, the jack 21 may be conveniently placed at a location within the luggage compartment not generally utilized by either luggage or other types of materials placed in the compartment. Also, by employing the spring 39 in conjunction with the lift mechanism 35, the amount the spring is tensioned may be regulated by the owner of the vehicle until the jack 21 is made secure and free from rattles. This jack storage is accomplished with relatively few parts since the one end of the supporting bracket 31 is mounted on structure normally present within the luggage compartment of the vehicle, namely, the mounting bracket 19 which supports the tire 18.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In a motor vehicle having a body portion provided with a luggage compartment and a spare tire mounted within said compartment, the combination comprising a vehicle jack having a base portion, an elongated supporting rod having one end secured to said base portion and a lift mechanism secured to said rod and adapted to be moved along said rod in response to actuation thereof, and jack stowage means including means for detachably securing said base portion to said vehicle within said compartment, a supporting bracket for carrying said rod, and a yieldable connector disposed between said vehicle and said lift mechanism and urging said rod against said supporting bracket, said connector being adapted to be tensioned in response to movement of said lift mechanism along said rod.

2. In a motor vehicle having a body portion provided with a luggage compartment, a spare tire mounted in a vertical position adjacent one wall of said compartment and means for mounting said tire in said vertical position disposed between said wall and said tire, the combination comprising a vehicle tire jack disposed between said tire and said wall and comprising a base portion, an elongated rod having one end thereof secured to said base portion and lift mechanism connected to said rod and adapted to be moved along said rod in graduated steps away from said base portion, and jack stowage means comprising means for detachably securing said base portion to said vehicle, a supporting bracket secured to said wall and to said tire mounting means, and a connector having one end secured to said vehicle at a location intermediate said base portion securing means and said tire mounting means and having its other end secured to said lift mechanism, said connector being adapted to rigidly urge said rod against said bracket in response to said graduated movement of said lift mechanism along said rod away from said base portion.

3. In a motor vehicle having a body portion provided with a luggage compartment and a spare tire mounted in a vertical position within said compartment adjacent one side of said vehicle, the combination comprising a vehicle jack having an elongated portion disposed at an acute angle relative to the floor of said compartment, and jack stowage structure disposed between said spare tire and said adjacent side and including mechanism for holding said jack in a rigid position, said mechanism comprising a supporting member secured to said adjacent side and carrying said elongated portion and securing means disposed between said jack and said vehicle and urging said elongated portion against said member, said securing means being adapted to hold said jack against displacement from said supporting member.

4. In a motor vehicle having a body portion provided with a luggage compartment and a spare tire mounted within said compartment, the combination comprising a vehicle jack having a base portion, an elongated supporting rod having one end secured to said base portion and a lift mechanism secured to said rod and adapted to be moved along said rod in response to actuation thereof, and jack stowage means including means for securing said base portion to said vehicle, a supporting bracket for carrying said rod, and a spring disposed between said vehicle and said lift mechanism adapted to be tensioned and to secure said rod on said bracket in response to movement of said mechanism along said rod.

5. In a motor vehicle having a body portion provided with a luggage compartment, a spare tire mounted in a vertical position adjacent one wall of said compartment and means for mounting said tire in said vertical position disposed between said wall and said tire, the combination comprising a vehicle tire jack disposed between said tire and said wall and comprising a base portion, an elongated rod having one end thereof secured to said base portion and a lift mechanism connected to said rod and adapted to be moved along said rod in graduated steps away from said base portion, and jack stowage means comprising means for detachably securing said base portion to said vehicle, a supporting bracket secured to said wall and to said tire mounting means, and a connector having one end secured to said vehicle at a location intermediate said base portions securing means and said tire mounting means and having its other end secured to said lift mechanism said connector comprising a spring being adapted to be expanded to rigidly secure said rod against said bracket in response to said graduated movement of said lift mechanism along said rod away from said base portion.

6. In a vehicle, apparatus for mounting a vehicle jack completely within the luggage compartment of said vehicle, said jack comprising relatively shiftable supporting and lifting elements and means for relatively shifting them, including a bracket engageable with an intermediate part of said supporting element for holding the main portions thereof in spaced relation to the floor of said compartment, and resilient means tensioned between said lifting element and the floor of said compartment and urging said jack toward said floor, said lifting element being shiftable relative to said floor by said shifting means for tensioning said resilient means and adapted to be energized by the normal relative shifting of said support and lifting elements by said shifting means.

7. Stowage apparatus for detachably mounting in a vehicle a jack of the type which includes a base portion provided with a rod extending therefrom having a shiftable vehicle support member thereon and comprising mechanism for shifting said vehicle support member along said rod in a direction away from said base portion and for releasably holding it in an adjusted position, said stowage mechanism including a fixed abutment member mounted on said vehicle and engageable with said base portion for holding said jack against movement in one direction, a bracket mounted on said vehicle engageable with said rod for supporting said jack in contacting relation to said abutment member, an anchor member fixed to said vehicle and including an element for detachable connection with said jack for urging said rod against said bracket and said base against said abutment member.

8. Stowage apparatus for detachably mounting in a vehicle a jack of the type which includes a base portion provided with a rod extending therefrom having a shiftable vehicle support member thereon and comprising mechanism for shifting said vehicle support member along said rod in a direction away from said base portion and for releasably holding it in an adjusted position, said stowage mechanism including a fixed abutment member mounted on said vehicle and engageable with said base portion for holding said jack against movement in one direction, a bracket mounted on said vehicle engageable with said rod for supporting said jack in contacting relation to said abutment member, a resilient anchor member fixed at one end to said vehicle and including an element detachably securable to said shiftable vehicle support member for urging said rod against said bracket and said base against said abutment member, said resilient anchor member being located between said bracket and abutment member and adapted to be tensioned and relaxed by shifting movements of said vehicle support member away from and towards said base portion respectively under the control of said shifting and release mechanism.

9. In a motor vehicle having a body portion provided with a luggage compartment, the combination comprising a detachable vehicle jack having a base portion including a foot element, an elongated supporting rod and shiftable lift mechanism mounted on said rod and adapted to be moved along said rod in graduated steps away from said base portion, and jack stowage mechanism including abutment means mounted within and on a wall of said compartment and engageable with said foot element for holding said jack against movement in one direction generally along its length, a supporting bracket secured to said vehicle engageable with said rod for supporting said jack against movement transversely of its length with said base in contacting relation to said abutment means, and an anchor member fixed at one end to said vehicle for urging said rod against said bracket and said foot element against said abutment means and including an element for detachable connection with said jack.

10. In a motor vehicle having a body portion provided with a luggage compartment, the combination comprising a detachable vehicle jack having a base portion, an elongated supporting rod and shiftable lift mechanism mounted on said rod and adapted to be moved along said rod in graduated steps away from said base portion, and jack stowage mechanism including abutment means mounted on a wall of said compartment and engageable with said base portion for holding said jack against movement in one direction, a supporting bracket secured to said vehicle engageable with said rod for supporting said jack with said base in contacting relation to said abutment means, and a resilient anchor member fixed at one end to said vehicle and detachably connected to said shiftable lift mechanism and adapted to be tensioned by movement thereof away from said base portion.

11. In a motor vehicle having a body portion, the combination comprising a vehicle tire jack disposed within said body portion and comprising a base portion, an elongated rod havng one end thereof secured to said base portion and lift mechanism connected to said rod and adapted to be moved along said rod in graduated steps away from said base portion, and jack stowage means comprising means for detachably securing said base portion to said vehicle, a supporting bracket secured to said body portion, and a connector having one end secured to said vehicle and having its other end secured to said lift mechanism, said connector rigidly urging said rod against said bracket in response to said graduated movement of said lift mechanism along said rod away from said base portion.

NEIL T. KELLEY.

REFERENCES CITED

The following references are of record in the file of this patent:

UNITED STATES PATENTS

| Number | Name | Date |
|---|---|---|
| 2,003,502 | Dwork | June 4, 1935 |
| 2,451,407 | Paolucci | Oct. 12, 1948 |
| 2,470,314 | Lim | May 17, 1949 |
| 2,518,412 | Wirth | Aug. 8, 1950 |
| 2,518,538 | Giblin | Aug. 15, 1950 |